United States Patent [19]
Suzuki et al.

[11] Patent Number: 5,420,483
[45] Date of Patent: May 30, 1995

[54] TELEVISION DEFLECTION DISTORTION CORRECTING CIRCUIT

[75] Inventors: Hitoshi Suzuki, Kanagawa; Takeshi Shouji, Chiba, both of Japan

[73] Assignee: Sony Corporation, Tokyo, Japan

[21] Appl. No.: 189,392

[22] Filed: Jan. 27, 1994

[30] Foreign Application Priority Data

Jan. 29, 1993 [JP] Japan ................. 5-034347

[51] Int. Cl.$^6$ .............................. H01J 29/56
[52] U.S. Cl. ................................... 315/371
[58] Field of Search ............ 315/371, 400, 405, 370

[56] References Cited

U.S. PATENT DOCUMENTS

| | | | |
|---|---|---|---|
| 4,024,432 | 5/1977 | Boekhorst | 315/371 |
| 4,777,411 | 10/1988 | O'3 Connor et al. | 315/371 |
| 4,988,927 | 1/1991 | Spruck | 315/371 |
| 5,260,628 | 11/1993 | Kawaberi et al. | 315/371 |

*Primary Examiner*—Theodore M. Blum
*Attorney, Agent, or Firm*—Peter C. Toto; Jerry A. Miller

[57] ABSTRACT

In an upper and lower pincushion distortion correcting circuit, so-called "cloak distortion" and "vertical intermediate-pincushion distortion" are corrected. A variable voltage source is connected to one end of a secondary winding of a transformer magnetically coupled with a primary winding thereof series-connected to a vertical deflection coil. A capacitor is connected between the other end of the secondary winding and the ground, and a series circuit constructed of a coil and a switch is connected in parallel to this capacitor. The so-termed "cloak distortion" is corrected by varying a resonance frequency of a sawtooth-shaped voltage in the horizontal scanning period, while an ON-period of the switch is controlled. Also, the "vertical intermediate-pincushion distortion" is corrected by varying an S-value of the sawtooth-shaped voltage in the vertical scanning period, while the source voltage of the variable voltage source is changed.

12 Claims, 8 Drawing Sheets

FIG. 9
(a) screen distortion

FIG. 9
(b) horizontal scanning period

FIG. 9
(c) ON/OFF of switch SW

FIG. 9
(d) waveform of conection current

FIG. 10 waveform of correction voltage vertical scanning period

TELEVISION DEFLECTION DISTORTION CORRECTING CIRCUIT

BACKGROUND OF THE INVENTION

1. Field of the Invention

The present invention generally relates to a deflection distortion correcting circuit for a television receiver. More specifically, the present invention is directed to an upper and lower pincushion distortion correcting circuit for correcting pincushion distortion in a vertical direction among raster pincushion correction occurred due to a difference between a curvature center of a display screen and a deflection center of electron beams in a television display tube.

2. Description of Related Art

Figure 1:
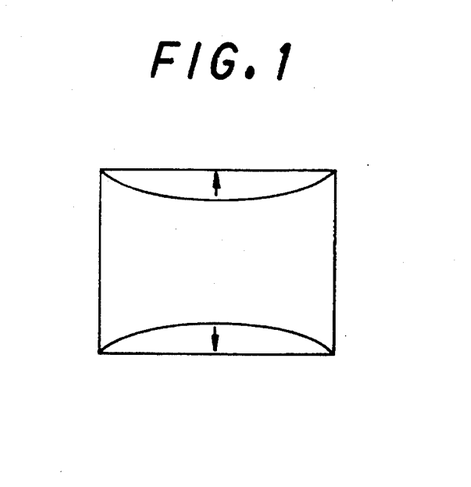
FIG. 1 schematically represents upper and lower pincushion distortion occurred in a display screen.
Figure 2:
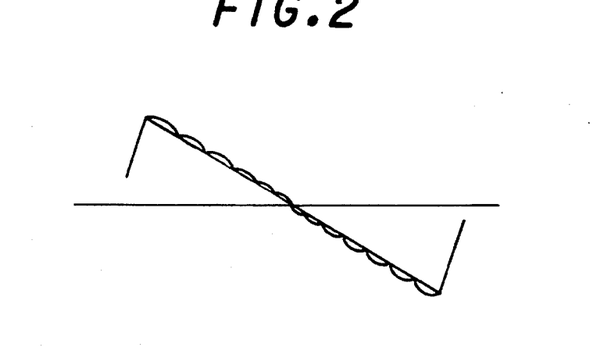
FIG. 2 is a waveform diagram of a current used to correct upper and lower pincushion distortion.

In general, since a curvature of a fluorescent screen of a display tube is considerably larger than that of a sphere formed by deflected electron beams with a deflection center, distances apart from the deflection center in peripheral portions of the fluorescent screen become large, as compared with distances near the deflection center, so that pincushion-shaped distortion (will be referred to "pincushion distortion") may be produced in a raster. As illustrated in FIG. 1, there are pincushion distortion occurring in a horizontal (right and left) direction and pincushion distortion occurring in a vertical (upper and lower) direction.

Figure 11:
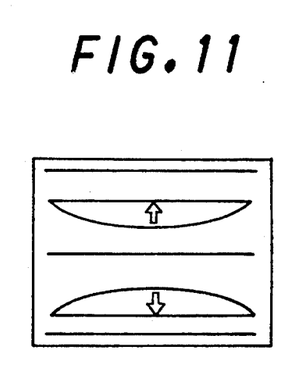
FIG. 11 schematically indicates an increase of correction amounts at an intermediate portion of a display screen, obtained by the amplitude modulation of FIG. 10.

In most of television display tubes, the upper and lower pincushion distortion could be corrected by varying magnetic field distributions of deflection yokes. However, since such upper and lower pincushion distortion could not be satisfactorily corrected by varying only the magnetic field distributions in the display tubes with wide deflection angles and large curvatures, the pincushion correction circuits are required. To correct the upper and lower pincushion distortion, as shown in FIG. 11, a parabolic current of a horizontal scanning period may be superimposed on a vertical deflection current in such a manner that a polarity of a front half portion in a vertical scanning period is opposite to that of a rear half portion, and an amplitude of the parabolic current is directly proportional to a vertical deflection current.

Typically, there are two conventional upper/lower pincushion correcting circuits, i.e., a saturable reactor type pincushion correcting circuit and a vertical deflection current self-correcting type pincushion correcting circuit. One of the conventional saturable reactor type pincushion correcting circuit is disclosed in commonly assigned U.S. Pat. No. 5,173,644 patented on Dec. 22, 1992 entitle to Aoki et al., "CONVERGENCE CORRECTION APPARATUS". That is, as represented in FIG. 3, this saturable reactor type pincushion correcting circuit is to supply the correction current into the vertical deflection coil VDY by resonance occurred in the capacitor series-connected to the vertical deflection coil VDY together with this defection coil with employment of the saturable reactor S.

On the other hand, the conventional vertical deflection current self-correcting method is described in, for instance, European Patent Application No. 0539078 A2 (assigned to the same assignee as the present U.S. patent application). This self-correcting method has such a circuit arrangement as shown in FIG. 4, in which the voltage is produced across the capacitor C2 by the vertical deflection current, and the switch SW is closed during the horizontal flyback period to produce the sawtooth voltage of the horizontal scanning period across the vertical deflection coil VDY, whereby the upper and lower pincushion distortion is corrected.

Figure 3:
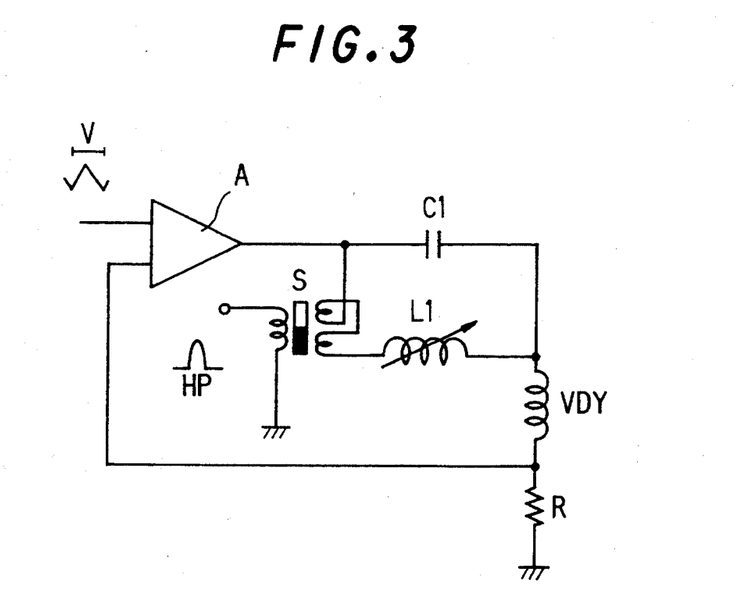
FIG. 3 schematically shows a circuit arrangement of a first example of the conventional upper and lower pincushion distortion correcting circuit.

Although the circuit arrangement of the saturable reactor correcting method shown in FIG. 3 can be made simple, no precise corrections or adjustments can be performed since the correcting wave is limited to the sine wave, so that a so-called "cloak distortion" may occur in which the amplitude of the both edge portions on the display screen is steeply compressed. Furthermore, the variable inductor L1 is required to correct the phase of the correction current by turning the adjusting screw of the core, resulting in cumbersome adjustments. Additionally, since the circuit performance is greatly influenced by the magnetic characteristic of the saturable reactor S, there are various problems in temperature characteristics and fluctuations of performance.

Figure 4:
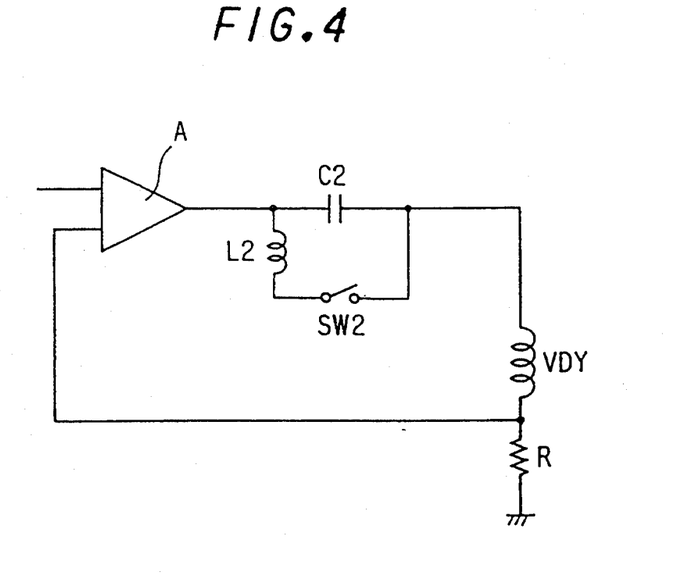
FIG. 4 schematically represents a circuit arrangement of a second example of the conventional upper and lower pincushion distortion correcting circuit.
Figure 6:
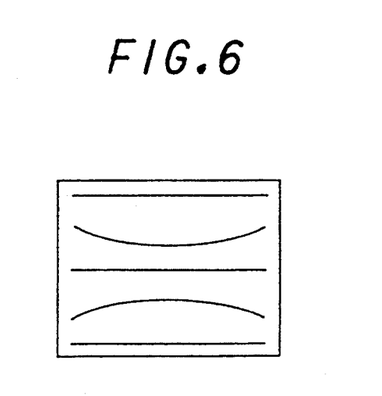
FIG. 6 schematically represents "vertical intermediate-pincushion distortion"

Although the vertical deflection current self-correcting method shown in FIG. 4 may improve the drawbacks of the above-described saturable reactor method, since the correcting amount is determined by the magnitude of the vertical deflection current, the "vertical intermediate-pincushion distortion" as shown in FIG. 6 cannot be corrected.

SUMMARY OF THE INVENTION

A primary object of the present invention is to provide an upper and lower pincushion distortion correcting circuit capable of correcting a so-called "cloak distortion" occurring in a television display screen.

A secondary object of the present invention is to provide an upper and lower pincushion distortion correcting circuit capable of correcting "vertical pincushion distortion".

A third object of the present invention is to provide an upper and lower pincushion distortion correcting circuit capable of correcting "vertical intermediate-pincushion distortion".

A fourth object of the present invention is to provide an upper and lower pincushion distortion correcting circuit capable of correcting "cloak distortion", "vertical pincushion distortion", and "vertical intermediate-pincushion distortion".

Figure 7:
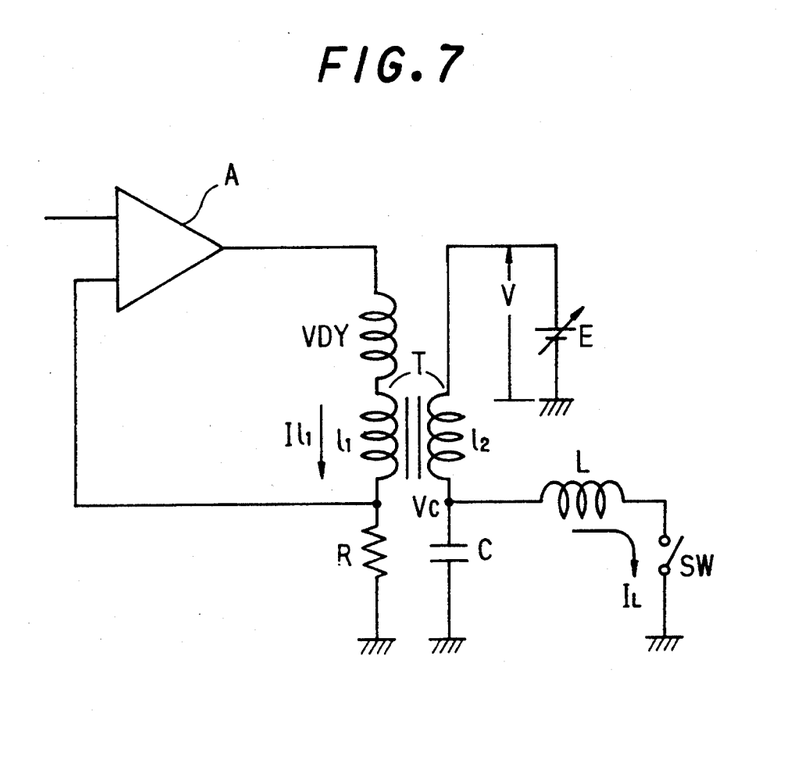
FIG. 7 is a circuit diagram for showing an arrangement of an upper and lower pincushion distortion correcting circuit according to an embodiment of the present invention.

In accordance with a first upper and lower pincushion distortion correcting circuit, an upper and lower pincushion distortion correcting circuit for correcting pincushion distortion along a vertical direction among raster pincushion distortion caused by a difference between a curvature center of a display screen of a display tube and a deflection center of electron beams, is characterized by comprising:

a primary coil (e.g., a primary coil of FIG. 7) series-connected to a vertical deflection coil;

a secondary coil (e.g., a secondary coil of FIG. 7) magnetically coupled to the primary coil; and voltage generating means (e.g., a capacitor C, a coil L, a variable voltage source E, and a switch SW) for generating a sawtooth-shaped voltage of a horizontal scanning period across the secondary coil, the amplitude of which is proportional to a value of a vertical deflection current, a polarity of a front half portion of said sawtooth-shaped voltage being opposite to that of a rear half portion thereof during a vertical scanning period, in order that a parabolic current of the horizontal scanning period is superimposed on a vertical deflection current flowing through the vertical deflection coil, the amplitude of which is proportional to a value of the vertical deflection current, a polarity of a front half portion of the vertical scanning period being opposite to that of a rear half portion of the vertical scanning period, wherein the above-described voltage generating means includes variable means (e.g., means for controlling an ON-period of the switch SW shown in FIG. 7) for varying a resonance frequency of the sawtooth-shaped voltage of the horizontal scanning period.

In accordance with a second upper and lower pincushion distortion correcting circuit, an upper and lower pincushion distortion correcting circuit for correcting pincushion distortion along a vertical direction among raster pincushion distortion caused by a difference between a curvature center of a display screen of a display tube and a deflection center of electron beams, is characterized by comprising:

a primary coil (e.g., a primary coil of FIG. 7) series-connected to a vertical deflection coil;

a secondary coil (e.g., a secondary coil of FIG. 7) magnetically coupled to the primary coil; and voltage generating means (e.g., a capacitor C, a coil L, a variable voltage source E, and a switch SW) for generating a sawtooth-shaped voltage of a horizontal scanning period across the secondary coil, the amplitude of which is proportional to a value of a vertical deflection current, a polarity of a front half portion of said sawtooth-shaped voltage being opposite to that of a rear half portion thereof during a vertical scanning period, in order that a parabolic current of the horizontal scanning period is superimposed on a vertical deflection current flowing through the vertical deflection coil, the amplitude of which is proportional to a value of the vertical deflection current, a polarity of a front half portion of the vertical scanning period being opposite to that of a rear half portion of the vertical scanning period, wherein the above-described voltage generating means includes variable means (e.g., a variable voltage source E shown in FIG. 7) for varying an amplitude of the sawtooth-shaped voltage of the vertical scanning period.

In accordance with a third upper and lower pincushion distortion correcting circuit, an upper and lower pincushion distortion correcting circuit for correcting pincushion distortion along a vertical direction among raster pincushion distortion caused by a difference between a curvature center of a display screen of a display tube and a deflection center of electron beams, is characterized by comprising;

a primary coil (e.g, a primary coil of FIG. 7) series-connected to a vertical deflection coil;

a secondary coil (e.g., a secondary coil of FIG. 7) magnetically coupled to the primary coil; and voltage generating means (e.g., a capacitor C, a coil L, a variable voltage source E, and a switch SW) for generating a sawtooth-shaped voltage of a horizontal scanning period across the secondary coil, the amplitude of which is proportional to a value of a vertical deflection current, a polarity of a front half portion of said sawtooth-shaped voltage being opposite to that of a rear half portion thereof during a vertical scanning period, in order that a parabolic current of the horizontal scanning period is superimposed on a vertical deflection current flowing through the vertical deflection coil, the amplitude of which is proportional to a value of the vertical deflection current, a polarity of a front half portion of the vertical scanning period being opposite to that of a rear half portion of the vertical scanning period, wherein the above-described voltage generating means includes variable means (e.g., a variable voltage source E shown in FIG. 7) for varying an S-value of the sawtooth-shaped voltage of the vertical scanning period.

In accordance with a fourth upper and lower pincushion distortion correcting circuit, an upper and lower pincushion distortion correcting circuit for correcting pincushion distortion along a vertical direction among raster pincushion distortion caused by a difference between a curvature center of a display screen of a display tube and a deflection center of electron beams, is characterized by comprising:

a primary coil (e.g., a primary coil of FIG. 7) series-connected to a vertical deflection coil;

a secondary coil (e.g., a secondary coil of FIG. 7) magnetically coupled to the primary coil; and voltage generating means (e.g., a capacitor C, a coil L, a variable voltage source E, and a switch SW) for generating a sawtooth-shaped voltage of a horizontal scanning period across the secondary coil, the amplitude of which is proportional to a value of a vertical deflection current, a polarity of a front half portion of said sawtooth-shaped voltage being opposite to that of a rear half portion thereof during a vertical scanning period, in order that a parabolic current of the horizontal scanning period is superimposed on a vertical deflection current flowing through the vertical deflection coil, the amplitude of which is proportional to a value of the vertical deflection current, a polarity of a front half portion of the vertical scanning period being opposite to that of a rear half portion of the vertical scanning period, wherein the above-described voltage generating means includes first variable means (e.g., means for controlling an ON-period of the switch SW shown in FIG. 7) for varying a resonance frequency of the sawtooth-shaped voltage of the horizontal scanning period, and second variable means (for example, variable voltage source E shown in FIG. 7) for varying an S-value and an amplitude of a sawtooth-shaped voltage of the vertical scanning period.

BRIEF DESCRIPTION OF THE DRAWINGS

For a better understanding of the present invention, reference is made of the following detailed description to be read in conjunction with the following drawings, in which.

DETAILED DESCRIPTION OF PREFERRED EMBODIMENTS

FIG. 7 represents an arrangement of an upper and lower pincushion distortion correcting circuit according to an embodiment of the present invention. An output terminal of amplifier A is connected to one end of a primary coil "$1_1$" of a correcting transformer "T", and the other end of this primary coil "$1_1$" is grounded via a current detecting resistor "R". One end of a secondary winding "$1_0$" of the correcting transformer "T" is connected to a variable voltage source "E". The other end of the secondary coil "$1_2$" is grounded via a capacitor "C". To this capacitor "C", a series circuit formed by a coil "L" and a control switch "SW" is parallel-connected. Both of the capacitor "C" and the coil "L" constitute a resonance circuit, and the switch "SW" is turned ON/OFF in accordance with the horizontal scanning period.

Then, operations of the embodiment shown in FIG. 7 will now be explained. Assuming now that the switch SW is turned OFF, a voltage across the capacitor "C" is maintained at the voltage of the variable voltage source "E". Next, when the switch SW is turned ON, parallel resonance caused by the coils "$1_2$", "L" and the capacitor "C" is commenced, as the voltage V is an initial value, and then the voltage across the capacitor "C" is reduced. When the switch SW is turned OFF at a time point where the voltage "Vc" appearing at one end of the capacitor "C" becomes a negative maximum value, namely at a time instant of a half of the resonant period, the resonance phenomenon caused by the coil "$1_2$" and the capacitor "C" is commenced, whereby the potential "Vc" is increased. When the switch SW is again turned ON, the parallel resonance caused by the coils "$1_2$" "L" and the capacitor "C" is commenced. As described above, the switch SW is turned ON/OFF in accordance with the horizontal scanning period, thereby producing a sawtooth-shaped voltage across the secondary coil "$1_2$".

Figure 8:
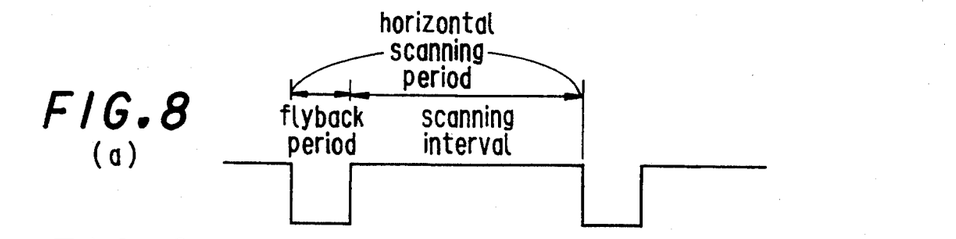
FIG. 8 is waveform charts for showing operation waveforms at various circuit points under normal condition according to the embodiment of FIG. 7.

As a result, another sawtooth-shaped voltage is similarly produced across the primary coil "$1_1$" magnetically coupled with the secondary coil "$1_2$", and thus, a parabolic current with the horizontal scanning period is superimposed to the vertical deflection current. In FIG. 8, there are shown operating waveforms of signals under the normal condition appearing at various points of the embodiment shown in FIG. 7. Actually, to correct upper and lower pincushion distortion, both of the magnitude and polarity of the vertical deflection current must be followed to those of the correction current. That is, the polarities of the voltage derived from the variable voltage source E are reversed during a front half period and a rear half period of the vertical scanning period, and the magnitude (amplitude) of this voltage is modulated in response to the magnitude of the vertical deflection current. This condition is typically represented as a coil current "$Il_1$" of FIG. 8.

Figure 5:
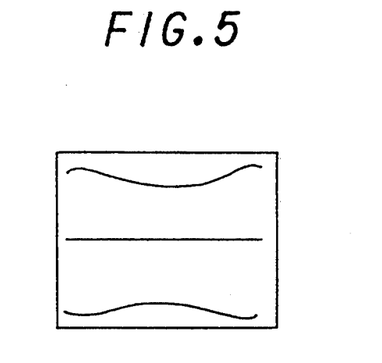
FIG. 5 schematically indicates a so-called "cloak distortion"
Figure 9:
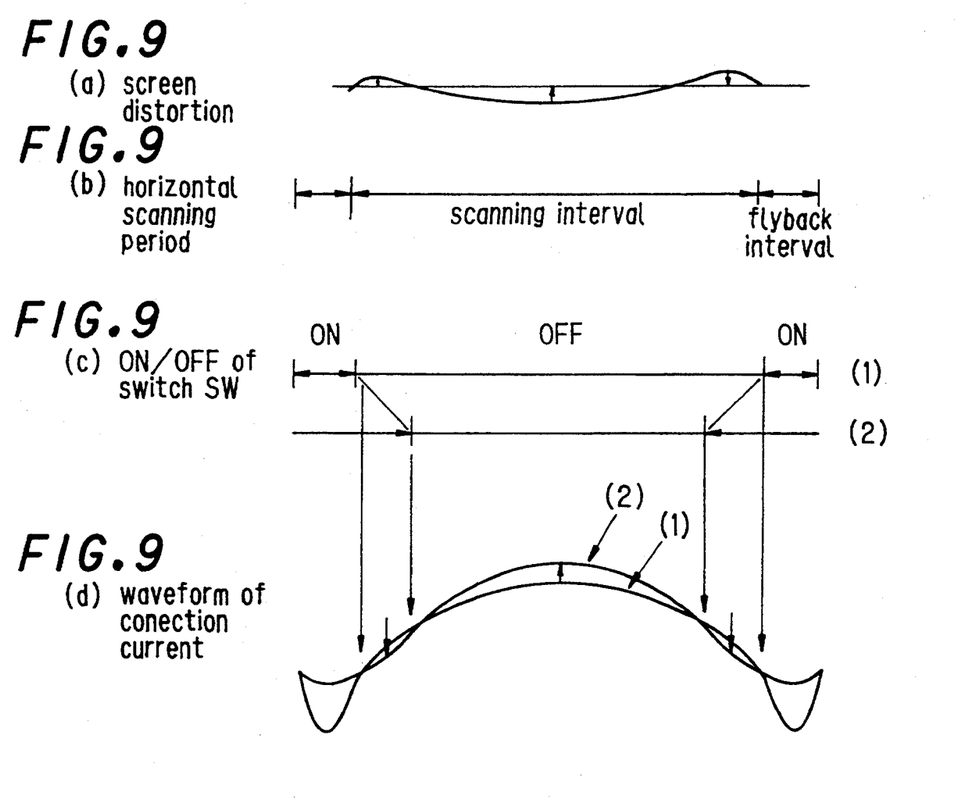
FIG. 9 schematically shows a relationship between ON/OFF periods of a switch SW shown in FIG. 7, a correcting current waveform, and upper/lower pincushion distortion.

Thereafter, a description will now be made of corrections about so-called "cloak distortion" and "vertical intermediate-pincushion distortion". As illustrated in FIG. 5, the "cloak distortion" may be corrected as follows, since both end portions of the display screen are steeply compressed, or shrieked. In other words, screen distortion (upper and lower pincushion distortion) appears as illustrated in FIG. 9(a). Assuming now that the ON/OFF interval of the switch SW and the waveform of the correction current appear as indicated by (1) of FIG. 9(d), it could be easily appreciated that the correction amounts for the beginning portion and the ending portion of the scanning interval are reduced, whereas the correction amounts for the remaining scanning interval are increased in order to correct such "cloak distortion". Accordingly, the ON-time period of the switch SW is winded to adjust, or control the waveform of the correction current as indicated by (2) of FIG. 9(d).

Figure 10:
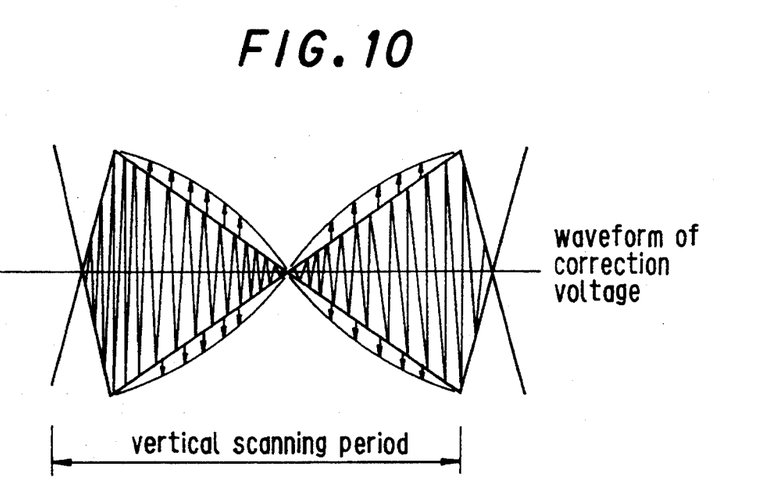
FIG. 10 is a waveform chart for showing an amplitude modulation of a correcting voltage waveform in the embodiment of FIG. 7.

On the other hand, the above-described "vertical intermediate-pincushion distortion" is caused, because the correction amounts for the intermediate portion of the display screen become shortage. Therefore, when the waveform of the correction voltage would be amplitude-modulated, as illustrated in FIG. 10, the correction amounts for the intermediate portion of the display screen would be increased, so that the "vertical intermediate-pincushion distortion" could be corrected as shown in FIG. 11.

Figure 12:
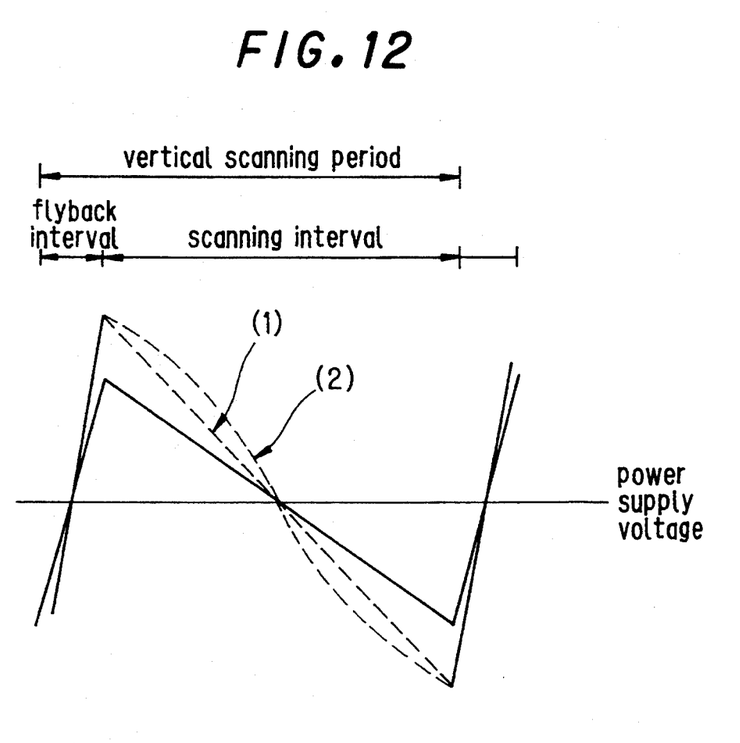
FIG. 12 schematically represents the correction of the "vertical intermediate distortion", while the amplitude of the sawtooth-shaped voltage in the vertical scanning period is varied to correct the "vertical pincushion distortion", by changing the S-value of the sawtooth-shaped voltage in the vertical scanning period.
Figure 13:
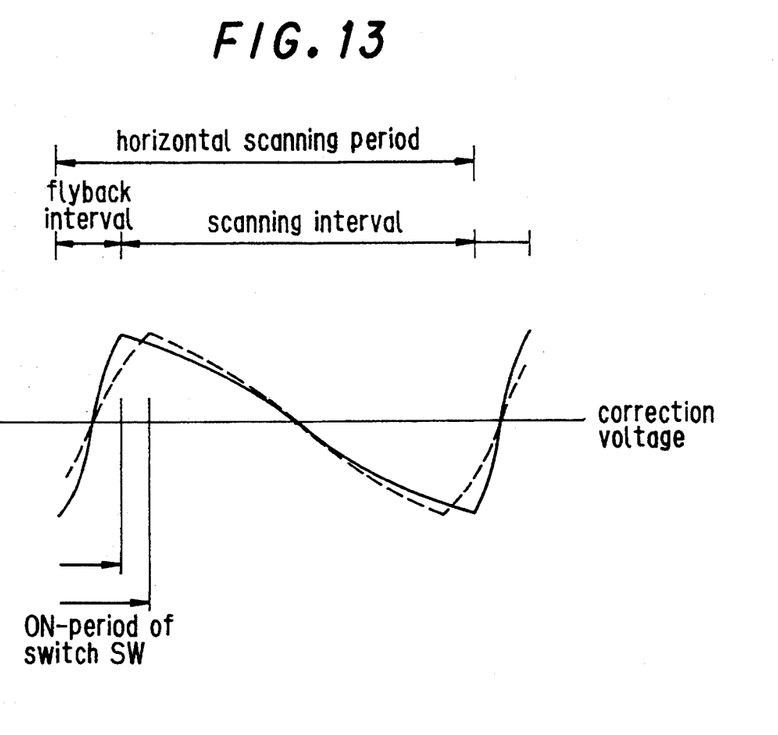
FIG. 13 schematically illustrates the correction of so-called "cloak distortion" by varying the resonance frequency of the sawtooth-shaped voltage in the horizontal scanning period while controlling the ON-period of the switch SW according to the embodiment shown in FIG. 7.

As previously described, in accordance with the embodiment of FIG. 7, the "vertical pincushion distortion" is corrected by varying the amplitude of the sawtooth-shaped voltage in the vertical scanning period (indicated by (1) of FIG. 12), the "vertical intermediate-pincushion distortion" is corrected by changing the S-value of the sawtooth-shaped voltage in the vertical scanning period (indicated by (2) of FIG. 12), and the so-called "cloak distortion" is corrected by controlling the ON/OFF period of the switch SW, thereby varying the resonance frequency of the sawtooth-shaped voltage in the horizontal scanning period (FIG. 13). The respective correction amounts could be substantially independently controlled. It should be noted that the overall correction amount may be varied by the winding ratio of the correcting transformer "T".

As previously explained, since the correction amount can be precisely adjusted in the above-described embodiment of FIG. 7, the "cloak distortion", "vertical pincushion distortion", and "vertical intermediate-pincushion distortion" can be corrected. The normal screen distortion characteristic can be achieved, and the output circuit portion is constructed of the resonance circuit, so that power consumption is lowered, better temperature characteristics are achieved, and stable operations may be performed without fluctuation in performance of the upper/lower pincushion distortion correcting circuit.

Figure 14:
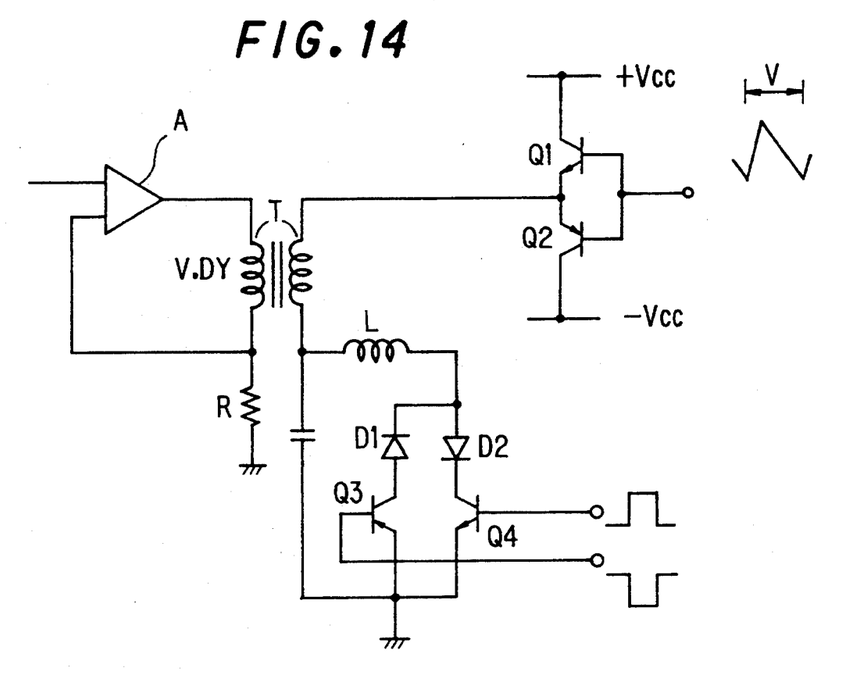
FIG. 14 is a circuit diagram for a first concrete circuit arrangement of the embodiment shown in FIG. 7.

FIG. 14 is a circuit diagram for showing a first example of a concrete circuit arrangement of the embodiment shown in FIG. 7. In this concrete example, the variable voltage source "E" of FIG. 7 is constructed of a push-pull amplifier including an NPN transistor Q1 and a PNP transistor Q2. The sawtooth-shaped voltage in the vertical scanning period is applied to the bases of these transistors Q1 and Q2. The switch SW of FIG. 7 is arranged by a bi-directional switch made by combining diodes D1, D2, a PNP transistor Q3, and an NPN transistor Q4. Rectangular voltages having opposite polarities are applied to respective bases of the PNP transistor Q3 and the NPN transistor Q4.

Figure 15:
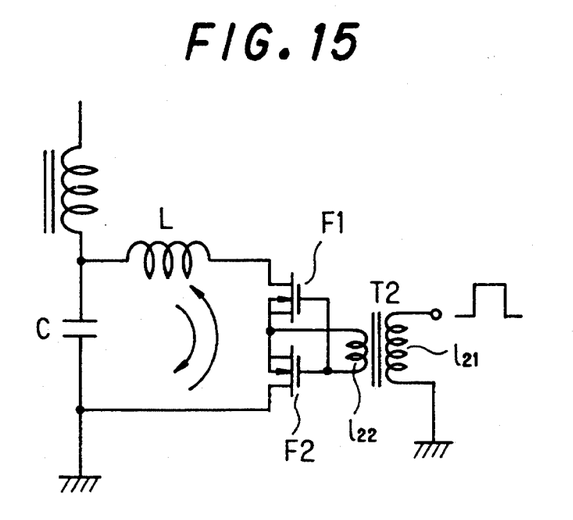
FIG. 15 is a circuit diagram for a second concrete circuit arrangement of the embodiment shown in FIG. 7.

FIG. 15 is a circuit diagram for indicating a second example of concrete circuit arrangement of the embodiment shown in FIG. 7. In this example, the switch SW of FIG. 7 is arranged not by the bipolar transistors, but by a bi-directional switch formed by combining two MOS type field effect transistors F1 and F2. Then, a rectangular voltage is applied via a transformer "T2" to gate electrodes of the field effect transistors F1 and F2.

It should also be noted that the variable voltage source "E" and the switch SW shown in FIG. 7 may be arranged by employing various circuit arrangement other than those of FIGS. 14 and 15.

In accordance with the first upper and lower pincushion distortion correcting circuit of the present invention, since such a sawtooth-shaped voltage of the horizontal scanning period that the value of this voltage is proportional to the value of the vertical deflection current, and the polarity of the front half vertical scanning period is reversed with respect to that of the rear half vertical scanning period, is produced across the secondary coil magnetically coupled to the primary coil series-connected to the vertical deflection coil, and also the resonance frequency of the sawtooth-shaped voltage in the horizontal scanning period is varied, the so-called "cloak distortion" can be corrected.

In accordance with the second upper and lower pincushion distortion correcting circuit of the present invention, since such a sawtooth-shaped voltage of the horizontal scanning period that the value of this voltage is proportional to the value of the vertical deflection current, and the polarity of the front half vertical scanning period is reversed with respect to that of the rear half vertical scanning period, is produced across the secondary coil magnetically coupled to the primary coil, and also the amplitude of the sawtooth-shaped voltage in the vertical scanning period is varied, the "vertical pincushion distortion" can be corrected.

In accordance with the third upper and lower pincushion distortion correcting circuit of the present invention, since such a sawtooth-shaped voltage of the horizontal scanning period that the value of this voltage is proportional to the value of the vertical deflection current, and the polarity of the front half vertical scanning period is reversed with respect to that of the rear half vertical scanning period, is produced across the secondary coil magnetically coupled to the primary coil, and also the S-value of the sawtooth-shaped voltage in the vertical scanning period is variable, the "vertical intermediate-pincushion distortion" can be corrected.

In accordance with the fourth upper and lower pincushion distortion correcting circuit of the present invention, since such a sawtooth-shaped voltage of the horizontal scanning period that the value of this voltage is proportional to the value of the vertical deflection current, and the polarity of the front half vertical scanning period is reversed with respect to that of the rear half vertical scanning period, is produced across the secondary coil magnetically coupled to the primary coil, and also the resonance frequency of the sawtooth-shaped voltage in the horizontal scanning period is variable, and furthermore both of the amplitude of the sawtooth-shaped voltage in the vertical scanning period and the S-value thereof are varied, the "cloak distortion", the "vertical pincushion distortion", and the "vertical intermediate-pincushion distortion" can be corrected.

What is claimed is:

1. A deflection distortion correction circuit wherein a parabolic correction current generated at a horizontal scanning period is superimposed on a vertical deflection current and the superimposed current is supplied to a vertical deflection coil to correct distortion, comprising:
   a primary coil series connected to the vertical deflection coil for receiving the vertical deflection current;
   a secondary coil having a first end and a second end, said secondary coil magnetically coupled to the primary coil;
   a variable voltage source connected to the first end of said secondary coil, said variable voltage source adapted to generate a voltage across said secondary coil that is not proportional to the vertical deflection current; and
   a resonance circuit connected to the second end of the secondary coil including a switch adapted to be turned ON/OFF at the horizontal scanning period thereby opening and closing the resonance circuit and inducing the parabolic correction current at the horizontal scanning period.

2. The deflection distortion circuit according to claim 1 wherein the switch has a variable ON/OFF period and variations in said ON/OFF period result in corresponding variations in a resonance frequency of the resonance circuit.

3. The deflection distortion circuit according to claim 1 wherein the ON time of the switch is variable.

4. The deflection distortion correction circuit of claim 3 wherein the switch is ON during at least part of a scanning interval of the horizontal scanning period.

5. The deflection distortion correction circuit of claim 3 wherein the switch includes a first diode having an anode connected to a collector of a first transistor and a cathode connected to an anode of a second diode, a cathode of the second diode connected to a collector of a second transistor.

6. The deflection distortion correction circuit of claim 5 wherein the first transistor is an NPN transistor and the second transistor is a PNP transistor.

7. The deflection distortion correction circuit of claim 6 wherein rectangular voltages having opposite polarities are applied to respective bases of the first and second transistor thereby turning the transistor ON/OFF.

8. The deflection distortion correction circuit of claim 7 wherein pulse widths of the rectangular voltages control the ON/OFF period of the switch.

9. The deflection distortion correction circuit of claim 5 wherein the transistors are MOS type field effect transistors.

10. The deflection distortion circuit according to claim 1 wherein the voltage generated by the variable voltage source is a sawtooth-shaped voltage proportional to the vertical deflection current except having an increased amplitude during intermediate portions of the vertical scanning period.

11. The deflection distortion correction circuit of claim 1 wherein the variable voltage source is a push-pull amplifier including a first transistor having an emitter coupled to the secondary coil and a base for receiving a generally sawtooth-shaped voltage at the vertical scanning period and a second transistor having an emitter coupled to the secondary coil and a base coupled to the base of the first transistor for receiving the generally sawtooth-shaped voltage at the vertical scanning period.

12. A deflection distortion correction circuit wherein a parabolic correction current generated at a horizontal scanning period is superimposed on a vertical deflection current and the superimposed current is supplied to a vertical deflection coil to correct distortion, comprising:

a primary coil series connected to the vertical deflection coil for receiving the vertical deflection current;

a secondary coil having a first end and a second end, said secondary coil magnetically coupled to the primary coil;

a variable voltage source connected to the first end of said secondary coil, said variable voltage source adapted to generate a voltage across said secondary coil, said voltage being a sawtooth-shaped voltage proportional to the vertical deflection current except having an increased amplitude during intermediate portions of the vertical scanning period; and a resonance circuit connected to the second end of the secondary coil including a switch adapted to be turned ON/OFF at the horizontal scanning period thereby opening and closing the resonance circuit and inducing the parabolic correction current at the horizontal scanning period, said switch having a variable period and being maintained in an ON position during at least part of a scanning interval of the horizontal scanning period and including a first diode with an anode connected to a collector of a first transistor and a cathode connected to an anode of a second diode, a cathode of the second diode connected to a collector of a second transistor.

* * * * *